United States Patent

[11] 3,540,534

[72] Inventor Basil C. Rhoads
R D02, Beaver Dams, New York 14812
[21] Appl. No. 812,159
[22] Filed April 1, 1969
[45] Patented Nov. 17, 1970

[54] STONE GATHERING MACHINE
10 Claims, 7 Drawing Figs.
[52] U.S. Cl. ............................................. 171/63;
214/83.14, 214/502, 214/520
[51] Int. Cl. ......................................... A01b 43/00
[50] Field of Search ............................................. 171/63,
101; 214/83.14, 502, 508, 509, 519, 520, 521, 522

[56] References Cited
UNITED STATES PATENTS
| | | | |
|---|---|---|---|
| 1,681,457 | 8/1928 | Asplund | 171/63 |
| 2,179,583 | 11/1939 | Wilson | 171/63 |
| 2,980,189 | 4/1961 | Jacobs | 171/63 |
| 3,431,979 | 3/1969 | Gregerson | 171/63 |

*Primary Examiner*—A. F. Guida
*Attorney*—James H. Gray

ABSTRACT: A stone and rock gathering machine which can be mounted on a self-powered wheeled vehicle, such as a farm tractor or a road grader. A rake is attached to the frame of the machine beneath the vehicle and between its front and rear wheels. The rake is set at an angle to the path of travel of the vehicle so as to have a leading end and a trailing end, and includes adjustable, spaced-apart teeth. A first conveyor is mounted at one side of the vehicle, generally parallel to its path of travel but inclined with respect to the ground surface. The inclined conveyor includes a continuous belt of linked, spaced-apart cross rods and may derive its power from the vehicle. The lower end of the inclined conveyor is pivotally attached to one end of the rake, and the upper end of the conveyor is pivotally attached to the frame of the machine. A second conveyor is pivotally attached to the frame of the machine and is transversely mounted in a generally horizontal position at the rear of the vehicle adjacent the upper or discharge end of the inclined conveyor. The horizontal conveyor includes a continuous hydraulically driven belt. A tiltable receptacle or bucket is centrally positioned at the rear of the vehicle normally beneath and adjacent the discharge end of the horizontal conveyor. A pair of hydraulically operated arms are positioned on either side of the vehicle and generally parallel with the center line thereof. The inner ends of the arms are pivotally attached to the frame of the machine and the outer ends of the arms are pivotally attached to the bucket. When filled with stones, the bucket is hydraulically lifted at the ends of the arms and hydraulically tilted to deposit the stones into a waiting, auxiliary vehicle, such as a dump truck.

INVENTOR.
Basil C. Rhoads
BY
AGENT

INVENTOR.
Basil C. Rhoads
BY
James H. Gray
AGENT

INVENTOR.
Basil C. Rhoads
BY
James H. Gray
AGENT

Fig. 7

INVENTOR.
Basil C. Rhoads
BY James H. Gray
AGENT

STONE GATHERING MACHINE

BACKGROUND OF THE INVENTION

1. Field of the Invention

My invention belongs to the field of land clearing machines known as stone pickers, rock pickers, stone gatherers and the like. More specifically, my invention pertains to a mechanically and hydraulically operated stone gathering machine especially suited for direct mounting on a self-propelled, wheeled vehicle from which it derives at least some of its operating power.

2. Description of the Prior Art

Contractors who lay underground gas and oil pipe lines, telephone and electric cables and the like, are usually required to restore to its original condition the surface of the land containing the right-of-way through which such pipe lines and cables pass. Stones or rocks smaller than about 2 or 3 inches in diameter are allowed to remain in place on the surface of the ground, and stones or rocks larger than about 10 or 12 inches in diameter are either buried, moved aside, or picked up by well-known heavy equipment such as bulldozers, back hoes, power shovels or the like. However, stones within the range between about 2 inches and 12 inches in diameter are too large to ignore and too small to warrant the use of heavy equipment for their removal and disposal.

Contractors commonly employ a crew of men to hand gather stones in the above mentioned range of diameters. Such a crew may include a foreman, six laborers and a truck driver. A typical crew can clear only several hundred yards of a 100 foot-wide right-of-way in an average working day. The amount of land cleared depends upon the surface condition and quantity of stones or rocks which must be gathered. Subsequently, the contractor often suffers excessive time and expense in restoring a right-of-way to acceptable standards of surface conditions.

U.S. Pat. Nos. 1,241,880; 1,713,952 and 2,852,082 disclose stone gatherers or rock pickers which belong to the field of my invention. Other examples of prior art machines in this field will be found under U.S. Patent Office classification 171-63.

Prior art stone gatherers, however, suffer from serious drawbacks or disadvantages which limit their usefulness in solving the contractor's problem. For example, the machines of the reference patents are intended to be drawn by horses or tractors. Thus, they lack satisfactory mobility and cannot closely approach the borders of ditches, streams and roadways because of the large turning radius required for the combination of towing and towed vehicles. As a result of this, a hand cleanup crew must follow these stone gatherers to remove stones which these machines cannot gather. Another disadvantage of the prior art machines lies in the difficulty of making power connections between the towing vehicle and the towed vehicle for the purpose of operating rakes, conveyors, buckets or receptacles and other devices which may be employed. In some instances, prior art towed machines have power sources mounted on them, but this arrangement is redundant and expensive, particularly when the towing vehicles themselves ordinarily have extra power available. Some prior art stone gatherers require an operator in addition to the operator of the towing vehicle, thus adding to their inconvenience and cost. Prior art machines which require towing behind a vehicle must also have wheels to support them for towing and maneuvering, also adding to their expense and to a redundancy of equipment and parts. Some of the prior art stone gatherers lack suitable means for adjustment to accommodate stones of various sizes, while others lack suitable receptacles to receive the raked stones, and require a separate, auxiliary vehicle to continuously pace them during stone gathering operations to receive the gathered stones.

Recognizing these disadvantages and drawbacks of the prior art, I have therefore set forth the following objects of my invention.

It is an object of my invention to provide a stone gathering machine which may be conveniently and directly mounted on a self-powered, wheeled vehicle.

It is another object of my invention to provide a stone gathering machine which can be operated with a minimum of man power, yet which can quickly and economically perform the work of many hand laborers.

It is still another object of my invention to provide a stone gathering machine which makes use of supporting wheels and power sources provided by the vehicle on which it is mounted, thereby achieving simplicity and operating economy.

It is a further object of my invention to provide a stone gathering machine which is capable of, and particularly suited for, gathering stones ranging in size from about 2 inches to 12 inches in diameter.

It is a still further object of my invention to provide a stone gathering machine which overcomes the drawbacks and disadvantages of prior art stone or rock gathering machines.

SUMMARY OF THE INVENTION

Briefly stated, my invention provides in combination with a self-powered land vehicle having front and rear wheels, a stone gathering machine which comprises: a horizontally disposed frame including substantially parallel, spaced-apart side rails rigidly connected together by cross members and removably mounted on said vehicle; a rake, pivotally and flexibly attached to said frame and positioned intermediate the front and rear wheels of said vehicle at an angle to the center line thereof so as to have a leading end on one side of the vehicle and a trailing end on the other side thereof, said rake having a plurality of adjustable, spaced-apart teeth; a first conveyor mounted at one side of said vehicle and generally parallel with the center line thereof, one end of said first conveyor being in a relatively high position and pivotally attached to said frame adjacent said rear wheels, the other end of said conveyor being in a relatively low position and pivotally attached to the trailing end of said rake; means for operating said first conveyor; means for raising and lowering at least one end of said rake and the lower end of said first conveyor; a second conveyor pivotally attached to said frame and mounted at the rear of said vehicle, substantially transverse said first conveyor and adjacent the relatively high end thereof; means for operating said second conveyor; a pair of horizontally spaced-apart arms arranged on either side of and generally parallel to the center line of said vehicle, the inner ends of said pair of arms being pivotally attached to the side rails of said frame; a tiltable receptacle pivotally attached to the outer ends of said arms and suspended therebetween; and means for raising and lowering said arms and for tilting said bucket.

BRIEF DESCRIPTION OF THE DRAWINGS

My invention may be better understood with reference to the accompanying drawings in which.

DESCRIPTION OF THE PREFERRED EMBODIMENT

Figure 1:
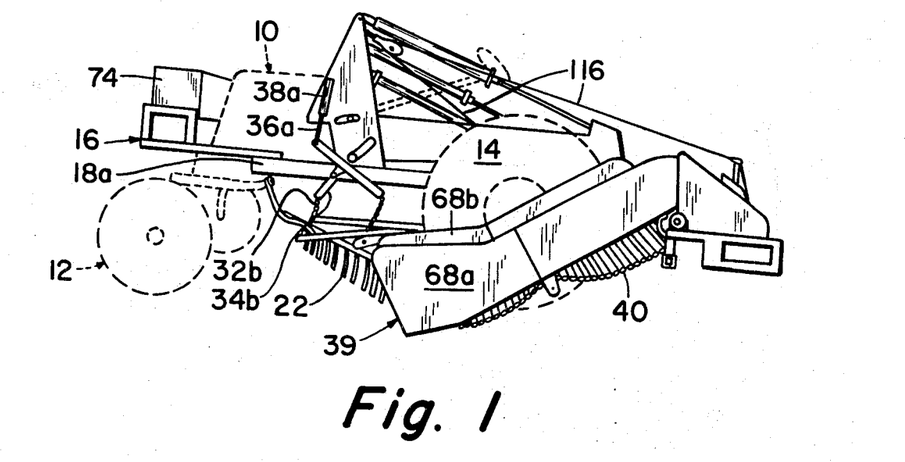
FIG. 1 is a side elevational view of a stone gathering machine in accordance with my invention shown mounted on a farm tractor which is illustrated in phantom outline.
Figure 2:
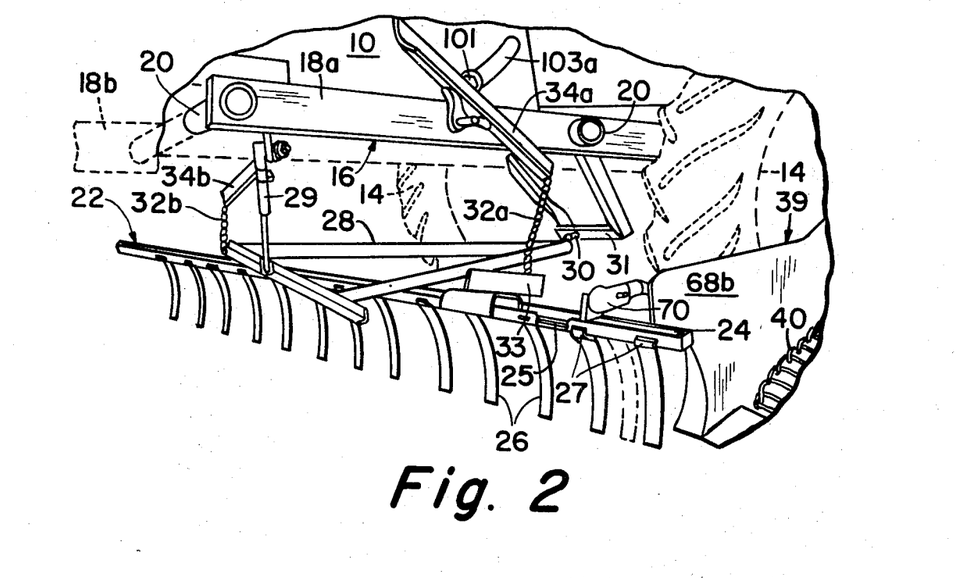
FIG. 2 is an enlarged, fragmentary perspective view of a portion of my stone gathering machine, showing the rake and its mounting and actuating mechanism.

FIG. 1 shows in phantom outline a self-powered, land vehicle such as farm tractor 10 having front wheels 12 and rear wheels 14. A frame 16 which includes generally parallel, spaced-apart side rails 18a, 18b rigidly connected together by cross members 20, which may best be seen in FIG. 2, is removably mounted on the tractor by any suitable means, such as nuts, bolts, bolting plates, clamps and the like. If it is not desired to remove the frame from the vehicle to which it is mounted, it may be welded in place. As may be more clearly seen in FIG. 2, a rake 22 is pivotally attached to frame 16. The rake comprises an elongated support bar 24 made from channel iron or other suitable material which has a continuous slot 25 along the length for the attachment of adjustable teeth 26. The teeth are preferably made from spring steel and are slightly curved. If desired, the teeth may be provided with blunt or sharp ends as may be convenient, but I have found squared ends to be satisfactory. The upper end of each tooth is provided with a lip 27 which bears against support bar 24. The spacing of teeth 26 along bar 24 may be adjusted to provide variable gaps between them. For the purpose of raking stones in the size range between 2 inches and 12 inches in diameter, I have found that the gaps should not be narrower than about 1 inch nor wider than about 3 inches. For the larger gaps, teeth may be removed as necessary, but for the smaller gaps, removal of the teeth is not required. For most purposes gaps of about 2 inches between the teeth are satisfactory, although there is no reason to have gaps between the teeth significantly different than the spaces between the cross rods of the main conveyor belt which will hereinafter be discussed. Rake 22 is positioned intermediate front wheels 12 and rear wheels 14 of tractor 10, and at an angle with respect to the center line of the tractor. Since the path of travel of the tractor is generally considered to be parallel to its center line, then it may also be said that the rake is positioned at an angle with respect to the tractor's path of travel. One end of rake 22 is closer to the front wheels of the tractor and may be called the leading end of the rake, and the other end is closer to the rear wheels of the tractor and may be called the trailing end of the rake. Support bar 24 is substantially parallel with the surface of the ground being raked. The rake is attached to frame 16 in the following manner. A triangular frame member 28 made from channel iron, angle iron or other suitable material is pivotally attached by means of a ball joint or universal joint 30 to an extension 31 which lies between the rear wheels 14 of tractor 10 and which is welded or otherwise rigidly attached to frame 16. The center of the foremost side of the triangular frame 28 opposite ball joint 30 is pivotally attached to one end of a Pitman arm 29. The other end of Pitman arm 29 is pivotally attached to side rail 18a of frame 16. Support bar 24 of the rake is welded or otherwise firmly attached to the triangular frame member in order to form the desired rake angle with respect to the center line of tractor 10. The rake angle may be conveniently adjustable to a predetermined value provided that the forward or leading end of the rake does not interfere with the front wheels of the tractor, and I have found that an angle of about 60° to the tractor center line is satisfactory. The ends of the rake extend beyond the side rails 18a, 18b of frame 16, and the effective length of the rake may be varied as desired by adding or removing teeth at the ends of support bar 24. A bracket 33 on support bar 24, intermediate the weldment to triangular frame 28 and the trailing edge of the rake, is attached by means of link chain 32a to one end of rocker arm 34a which is pivotally attached at its center to side rail 18a of frame 16. The other end of rocker arm 34a is attached to piston 36a of hydraulic cylinder 38a. In similar manner, but only partly shown in FIGS. 1 and 2, the foremost right hand apex of triangular frame member 28 is attached by means of a link chain 32b to one end of a rocker arm 34b which is pivotally attached at its center to side rail 18b of frame 16. The other end of rocker arm 34b is connected to piston 36b of hydraulic cylinder 38b. For the sake of convenience and simplicity, I have employed automobile power steering cylinders for 38a, 38b, but it will be obvious that other cylinders would be suitable and satisfactory for the purpose. It will also be apparent to one skilled in the art that support bar 24 of the rake could be directly attached to pistons 36a, 36b or to suitable extensions thereof, but I have found that the attachment hereinabove described provides a desirable, free-floating, action of the rake which enables it easily to follow ground contours. Although not shown in the drawings, it will be obvious to the skilled practitioner that one or more wheels may be attached to cross bar 24 of the rake and positioned adjacent the leading end or the trailing end, or both, of the rake to prevent the teeth of the rake from penetrating too far into a soft or muddy surface of the ground being raked. Such wheels, for example, may be of the castered type.

Figures 3, 4:
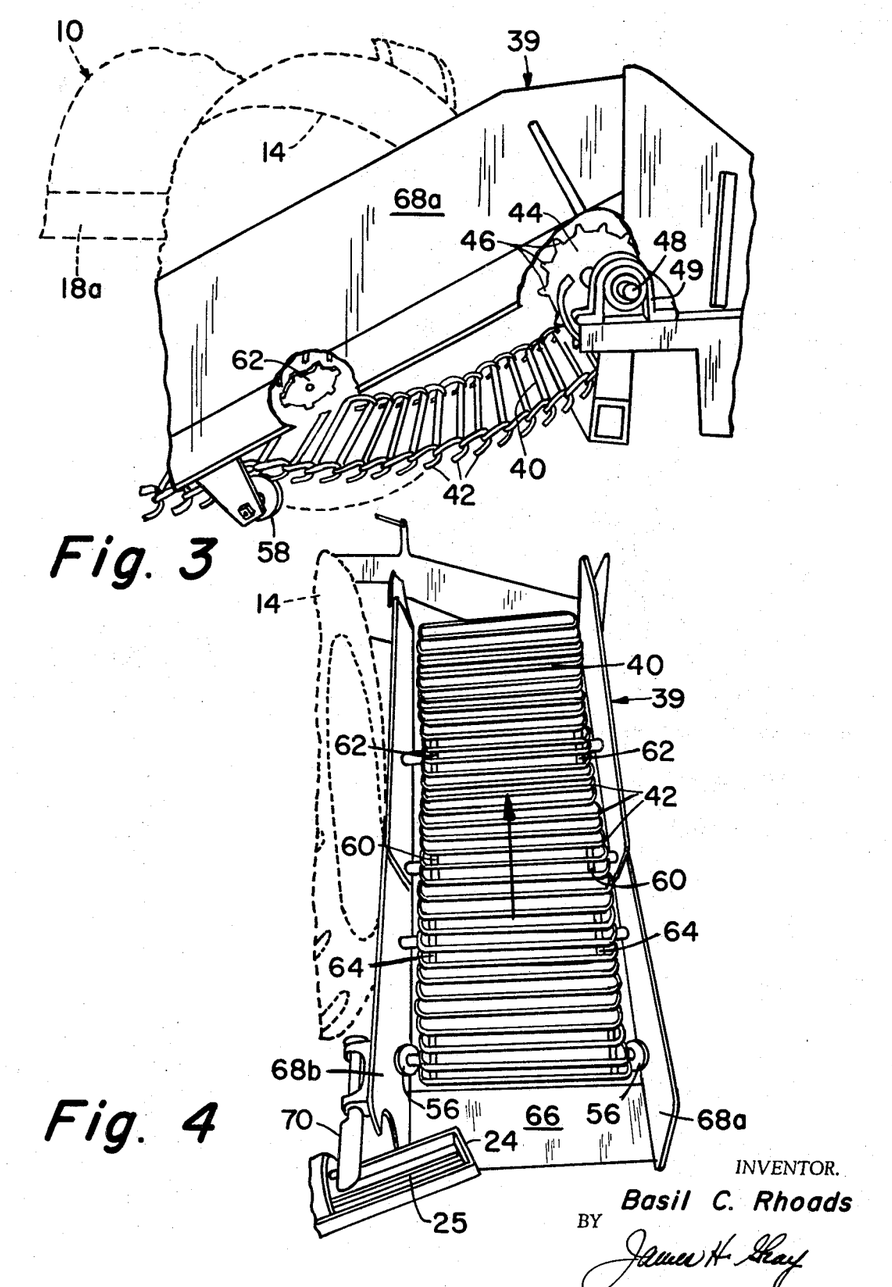
FIG. 3 is an enlarged, fragmentary side elevational view of a portion of the stone gathering machine, showing the inclined conveyor.
FIG. 4 is a fragmentary front elevational view of the inclined conveyor of my stone gathering machine.

As shown in FIGS. 3 and 4, there is mounted a conveyor 39 at one side of tractor 10 and outboard of the left rear wheel 14. The conveyor is mounted substantially parallel to the center line of the tractor and also parallel to side rails 18a, 18b of frame 16, but is arranged to be higher at one end than at the other for reasons which will hereinafter be described. Conveyor 39 is provided with a flexible, endless loop belt 40 comprising end-linked crossrods 42. The crossrods are spaced-apart so as to leave a gap of about 2 inches between adjacent rods. The conveyor belt 40 is thus very flexible and can be made as long or as short as desired by adding or subtracting crossrods 42. Belt 40 is driven by sprocket 44 which may also be seen in FIGS. 4, 5, and 6. Sprocket teeth 46 engage the edges of belt 40 adjacent and just inside the linked ends of the crossrods. Sprocket 44 is attached to a variable speed transmission indicated schematically at 52, by means of a journaled drive shaft 48 and a universal joint 50. The drive shaft may be carried in suitable bearings or journals such as pillow blocks 49. The variable speed transmission 52 derives power from the power take off unit of tractor 10. The top surface of belt 40 normally travels upwardly and rearwardly as shown by the large arrow in FIG. 4 by clockwise rotation of sprocket 44. However, if it is necessary to clear a jammed belt, or for any other purpose, sprocket 44 may be driven counterclockwise by means of a reverse gear arrangement in the variable speed transmission. Belt 40 is supported at its lower end by idler wheels 56 which may best be seen in FIG. 4. The lower portion of belt 40 is supported intermediate the idler wheel 56 and sprocket 44 by means of additional, opposing idler wheels 58 and 60 which engage the belt edges. The upper portion of belt 40 is supported by two pairs of opposing shaker sprockets 62, 64 mounted for free rotation on the frame of conveyor 39. The belt shaker sprockets are oval in shape and have teeth which engage crossrods 42 adjacent the belt edges. As the flexible belt passes over the shaker sprockets, the sprockets rotate, thereby lifting and dropping the top portion of the belt. Conveyor 39 is provided with suitable side plates 68a, 68b conveniently made from sheet metal or other suitable material to protect the vehicle operator or other persons hereby and to prevent conveyed rocks and stones from falling off the edges of the belt. A shovellike nose or lip 66 is provided at the lower end of the conveyor 39 to contact the ground and to slide underneath and scoop up raked stones.

Referring again to FIGS. 2 and 4 there is shown a ball-and-socket joint 70, the socket of which is attached to side cover 68b of conveyor 39, and the ball of which is attached by a bracket to support bar 24 at the trailing end of rake 22. The ball-and-socket joint, acting in conjunction with Pitman arm 29 and ball joint 30 of triangular number 28 permits rake 22 and the lower end of conveyor 39 to be lifted from the ground in order to clear obstacles which cannot be raked.

Figure 5:
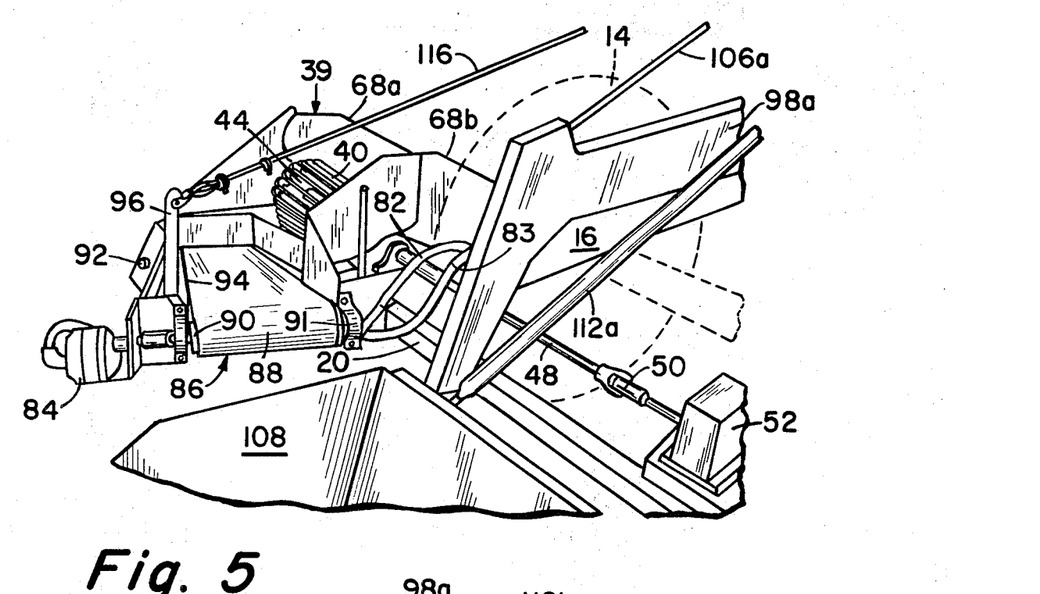
FIG. 5 is an enlarged, fragmentary rear view, in perspective, of the inclined conveyor, the transverse conveyor and the bucket of my stone gathering machine.

Referring now to FIG. 5, a second conveyor 86 is pivotally mounted along one edge thereof to a cross member 20 located at the rear of frame 16. This cross member may be conveniently channel-section or box-section iron or other suitable material. Conveyor 86 is positioned adjacent the top end of conveyor 39 and is located at substantially right angles thereto in order to receive conveyed stones therefrom. Conveyor 86 is provided with an endless, or continuous, loop belt 88 which is preferably made from solid, flexible material such as rubberized fabric for example. If desired, a chain belt or a linked crossrod belt may be employed. A drive roller 90 is journaled for rotation, for example by means of pillow blocks 91, at one end of the conveyor and is rotatably connected by any suitable means to hydraulic motor 84. At the other end of conveyor 86, as shown in FIG. 5, there is provided an idler roller 92 journaled for rotation by pillow blocks, for example. Such roller maintains the belt 88 in a continuous taut loop. Suitable shields 94 are provided to protect the vehicle operator or other persons from injury, and to prevent conveyed material from falling off the edges of the belt. By means of variable speed hydraulic motor 84 the belt 88 may be driven at a desired linear speed so that it may be synchronized with belt 40 of conveyor 39 to prevent an undue pileup of stones on either belt. Another advantage of the variable speed of belt 88 will be discussed hereinafter relative to the operation of my invention.

Figure 6:
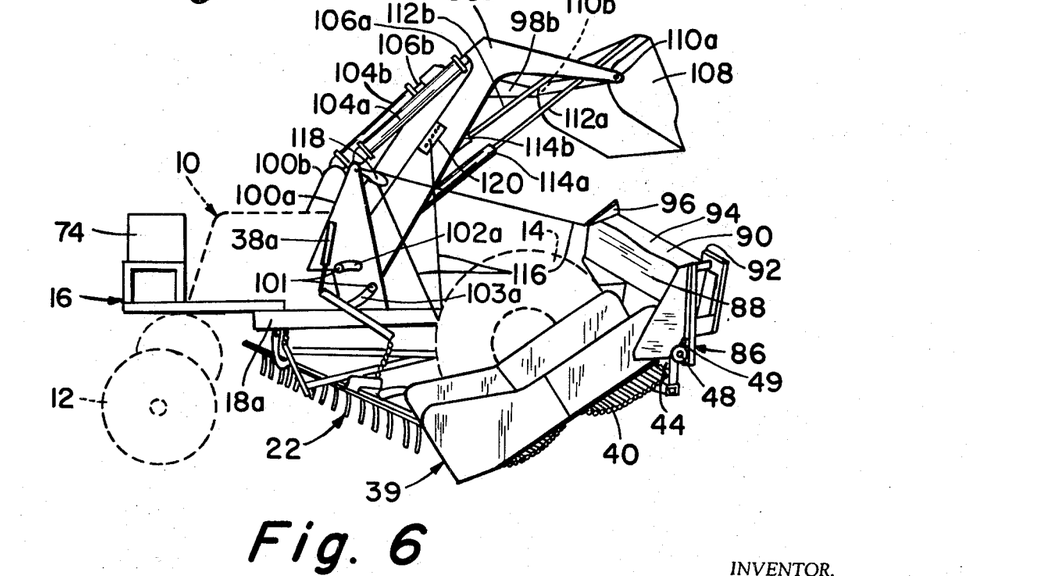
FIG. 6 is a side elevational view of the stone gathering machine of FIG. 1, showing the bucket in its raised, tilted position, and showing the transverse conveyor in its vertical position.

As will be seen in FIG. 6, conveyor 86 is pivoted about an axis parallel to the foremost edge thereof, from a normally horizontal to a vertical position, to facilitate moving an ancillary vehicle close to the rear of tractor 10, or to facilitate moving the rear of tractor 10 close to an obstruction. The pivot mechanism is simple and consists of bearings such as pillow block 49 mounted to the conveyor frame for rotation about drive shaft 48. The means for tilting the conveyor from its normally horizontal to a vertical position includes cable attachment bracket 96 which is fixedly attached to the rearmost edge of the conveyor frame and will be described in more detail hereinafter.

As will be particularly noted in FIG. 6, my stone gathering machine includes a pair of arms 98a, 98b which are disposed on either side of tractor 10 in substantially parallel arrangement with the center line thereof. The inner ends of arms 98a, 98b are pivotally attached to frame 16 through inverted V-shaped members 100a, 100b, the bases of which are welded to side rails 18a, 18b. V-shaped members 100a, 100b are provided with arcuate slots 102a, 102b, and 103a, 103b; of which only slots 102a and 103a are shown. The slots act as sliding pivot points for the arms. Suitable bolts or pins 101 are attached to the inner ends of the arms and project through slots 102a, 102b and 103a, 103b to act as pivot pins on the bearing surfaces of the slots. The bolts also serve to retain the arms from undesired lateral or longitudinal movement with respect to frame 16. Hydraulic cylinders 104a and 104b containing pistons 106a and 106b, respectively, are pivotally attached to the apex or upper ends of inverted V-shaped members 100a, 100b. The outer ends of the pistons are attached to arms 98a, 98b intermediate the ends thereof. Hydraulic cylinders 104a, 104b are actuated simultaneously to raise arms 98a, 98b to any desired position between full retraction and full extension of the pistons.

A receptacle, or bucket, 108 is pivotally attached by suitable pivot means 110a, 110b to the outer ends of arms 98a, 98b and is supported transversely between such arms for tilting about the pivot means. In the normal position, bucket 108 is disposed at the rear of tractor 10 adjacent the discharge end of conveyor 86. The open side of the bucket is uppermost and substantially parallel to the ground. One end of the bucket lies approximately beneath the roller 90 of conveyor 86. A pair of parallel, spaced-apart operating rods 112a, 112b are pivotally attached to the forward side of bucket 108 adjacent the upper open lip thereof. These rods are connected to pistons in hydraulic cylinders 114a, 114b respectively and serve to tilt the bucket about pivot means 110a, 110b when the cylinders are actuated and when the arms 98a, 98b are in their uppermost raised position. The bucket may be tilted at other times, however, to serve as a shovel or scoop when the arms are in their lowered positions or in an intermediate position.

In order that a vehicle such as a dump truck or the like may closely approach the rear of the stone gathering machine when the bucket is full and when the arms are raised, I have provided a simple but effective means for tilting conveyor 86 about drive shaft 48, as shown in FIGS. 5 and 6, a cable 116 is attached to cable attachment bracket 96 on the conveyor. The cable is routed toward the front of the tractor and passes around a self-aligning pulley 118 which is attached to the upper end of inverted V-shaped member 100a. The cable then passes around a freely rotatable block attached to the inside of rail 18a, and thence to a drilled plate 120 attached to arm 98a, where it is adjustably fastened by a hook or other suitable means in the proper drilled hole. As the arms 98a, 98b are raised, the cable slack is taken up and conveyor 86 is pivoted about shaft 48 into its vertical position. I have adjusted the length of the cable so that when the arms are lowered, there is very little slack in the cable and when the arms are raised the cable is taut but puts no strain on the conveyor.

Figure 7:
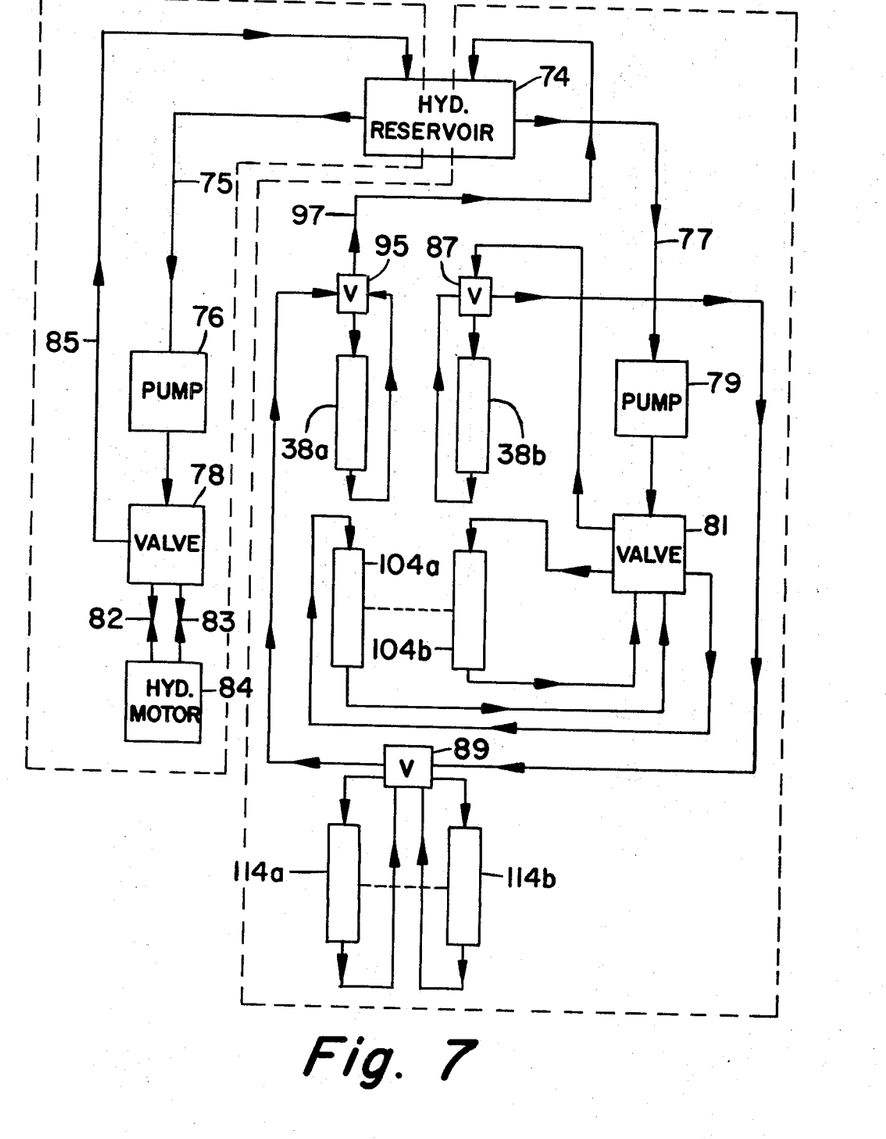
FIG. 7 is a schematic view of the hydraulic system for operating the various mechanisms of my stone gathering machine.

Referring now to FIG. 7, taken in conjunction with FIGS. 1 and 6, there is shown a container or reservoir 74 which contains a supply of hydraulic fluid for operating the various mechanisms of my machine. As will be understood by one skilled in the art, other self-powered vehicles may incorporate their own hydraulic systems, and the one which is shown and described herein is by way of example only, and illustrates the arrangement which I have successfully used with my invention. The hydraulic system is basically in two parts; a primary or main system which may be a part of the tractor itself and which is used to power the various cylinders for raising and lowering the bucket arms, for tilting the bucket and for raising and lowering the rake; and a secondary or auxiliary system which preferably has its own source of hydraulic fluid, its own pump and its own operating valve, for operating the second, i.e., transverse, conveyor.

In the secondary system, hydraulic fluid is pumped from reservoir 74 through hydraulic line 75 by means of a hydraulic pump 76, which may be a gear pump or a vane pump, and into valve 78 which is of the on-off, open-spool type, capable of handling the total fluid flow required by hydraulic motor 84. Valve 78 is combined with an internal relief valve which is manually adjustable to provide the desired operating flow rate and pressure for the system, thereby controlling the speed of the hydraulic motor. The relief valve has a built-in bypass to return unused hydraulic fluid to the reservoir and to relieve unused system pressure. I have found that a double-acting valve is preferable to a single-acting valve, so that the motor may be run backwards or forward if desired, allowing the conveyor belt 88 to move in either direction. Valve 78 is connected by suitable pressure hoses 82, 83 to hydraulic motor 84. Hydraulic fluid is returned to reservoir 74 by return line 85. Thus, the secondary system is a closed-circuit system which, in my invention, is employed solely for operating transverse conveyor 86.

The primary hydraulic system may have its own fluid reservoir or may employ fluid reservoir 74 which is connected by hydraulic line 77 to a pump 79, such as a vane pump or gear pump, and then into a double valve 81 which operates bucket arm cylinders 104a and 104b in unison. Connected in series with valve 81 is single valve 87 which operates rake cylinder 38b. Connected in series with valve 87 is double valve 89 which operates bucket tilt cylinders 114a and 114b in unison. Connected in series with valve 89 is single valve 95 which operates rake cylinder 38a. Valve 95 is connected to the reservoir by a return line 97. It will be understood that the valves 81, 87, 89 and 95 need not be special, and may be selected from a wide variety of valves suitable for operating hydraulic cylinders. However, it will be noted that the hydraulic system of my invention is of the continuous flow type in which fluid is always available for operation of the utilization device and the valves should be of a type intended for a continuous flow system. Each valve in both the primary and the secondary systems is provided with a manual control, not shown, for operation of the valve and its associated hydraulic device, as will be understood by one skilled in the art. Such controls are conveniently mounted so as to be readily accessible to the operator of the vehicle when he is in the driving position.

In a typical example of my invention, I have used a 1947 Oliver farm tractor because it was available and suitable for the purpose. The first, or inclined, conveyor was made from parts of a potato digger (make and model unknown). The spacing between the crossrods of the belt of the first conveyor is about 2 inches. Ball and socket joint 70 was made from a trailer hitch using a 2 inch diameter ball. Variable speed transmission 52 was salvaged from a small foreign automobile and allows drive sprocket 44 to be run at four selectable forward speeds and one reverse speed. This permits the sprocket to rotate between about 30 and 300 r.p.m. at the will of the operator. The reservoir for hydraulic fluid was welded from sheet metal and has no particular desired shape. Hydraulic pump 76 which powers only hydraulic motor 84 of second conveyor 86 is a hydraulic vane pump having the following characteristics:

TABLE I

| R.p.m.: | Gallons per minute at— | | |
|---|---|---|---|
| | 500 p.s.i. | 1,000 p.s.i. | 1,500 p.s.i. |
| 500 | 8.95 | 8.65 | 8.40 |
| 900 | 15.95 | 15.65 | 15.20 |
| 1,200 | 21.55 | 21.30 | 20.90 |
| 1,500 | 26.90 | 26.55 | 26.05 |
| 1,800 | 31.90 | 31.40 | 31.00 |

The horsepower required to drive this pump is 2.96 at 500 p.s.i. and 500 r.p.m. and 29.7 at 1,500 p.s.i. and 1,800 r.p.m. The maximum r.p.m. is 2,000 and the required starting r.p.m. is 600. The pump may be rotated in either direction and has an intake port diameter of 1¼ inches (NPT), a discharge port diameter of three-quarters inch (NPT), and a drive shaft 1 inch in diameter by 2½ inches long. The overall dimensions of the pump are 5½ inches by 6½ inches by 8¼ inches and its total weight is 17 pounds.

The hydraulic motor which drives belt 88 of the second conveyor 86 has the following characteristics:

TABLE II

| R.p.m.: | Gallons per minute | Horsepower |
|---|---|---|
| 183 | 14.2 | 9.0 |
| 150 | 11.5 | 7.9 |
| 100 | 7.7 | 5.3 |
| 75 | 5.8 | 4.0 |
| 50 | 3.8 | 2.7 |
| 25 | 1.9 | 1.4 |

The FIGS. in this table are based on an operating pressure of 1,500 p.s.i. The speed of the motor is controlled by a valve which controls the rate of flow of hydraulic fluid to the motor. The motor shaft is 1 inch in diameter by 2 inches long, the motor dimensions are 8¼ inches by 3¼ inches by 3¼ inches, and its weight is 12 pounds.

Control or spool valve 78 is capable of handling a fluid flow of up to about 15 gallons per minute. The adjustable relief valve which is incorporated in the spool valve is capable of handling fluid pressures from about 200 to 2,000 p.s.i. This valve is of the bypass type as previously noted so that if, for example, a limited pressure is selected to operate hydraulic motor 84 slowly, the remaining pressure supplied by pump 76 will be relieved, and the excess fluid flow will be bypassed to fluid reservoir 74.

Arms 98a, 98b; bucket 108; arm supports 100a, 100b and associated operating mechanisms were salvaged from a 1946 John Deere Front Loader, Model 50. The advantage of this model over currently available models known to me lies in the fact that the arms are pulled instead of pushed into the raised position by the hydraulic cylinders. Thus, the arms may be positioned relatively lower on the frame of my machine, providing greatly improved visibility for the vehicle operator. The outer ends of the arms have been cut and rewelded to form an angle of about 45° with the inner arm portions. This modification permitted a low bucket position with the arms lowered to facilitate the transfer of raked stones into the bucket and, as an additional benefit, provided a lower center of gravity for the combination. I do not know of any suitable substitutes which could be used without extensive modification.

The rake on my stone gathering machine was wholly fabricated by me, there being no satisfactory or suitable substitutes known to me. Support bar 24 was made from two lengths of angle iron welded together by transverse gusset plates. Slot 25 is provided by the separation of the stems of the iron angles, and runs the total length of the bar to facilitate spacing of adjustable teeth 26. The teeth were salvaged from an old drag rake of unknown make or model. I welded a lip or flange 27 on each tooth to facilitate adjustment and add strength by increasing the bearing surface against bar 24. The teeth are attached by bolts which pass through slot 25. I found that the teeth should be tough and resilient, and I therefore oil-tempered them to increase their springlike quality.

The following information will be helpful in fully understanding the operation of my invention.

As tractor 10 moves forward under the control of its human operator, stones between about 2 inches and 10 inches in diameter are raked by rake 22. As the stones accumulate in front of teeth 26, they are moved along the rake in the direction of conveyor 39 due to the angle at which the rake is attached to the tractor. As the stones spill off the trailing end, that is, the end nearest conveyor 39, shovellike lip 66 slides under them and they are carried to belt 40. The direction of rotation of sprocket 44 and shaft 48 is such that as the top of belt 40 moves upwardly and rearwardly the stones are prevented from falling off the edges of the belt by side plates 68a and 68b. If desired, in order to free a jammed belt which has become wedged by stones, sticks or other material, the belt movement can be reversed by means of the reverse gear in variable speed transmission 52. Removal of any extraneous material or debris, such as clumps of soil, from the stones is accomplished by belt shaker sprockets 62, 64 which shake the belt 40 as crossrods 42 engage the sprocket teeth. The extraneous material then passes between crossrods 42 and falls to the ground.

By means of suitable manual controls, not shown, the vehicle operator engages variable speed hydraulic motor 84 which is supplied with fluid from hydraulic reservoir 74 via valve 78, flexible supply lines 82, 83 and hydraulic pump 76. Hydraulic motor 84 turns roller 90 which engages solid belt 88 of conveyor 86, causing the upper surface of the belt to move in a direction toward the receptacle or bucket 108, one edge of which is beneath roller 90. Stones are transferred from conveyor 39 to conveyor 86 by the movement of belt 40, and from conveyor 86 to bucket 108 by the movement of belt 88. Stones are prevented from falling off the edges of conveyor 86 by shields 94. A particular advantage of variable speed motor 84 will now be described.

At a relatively low speed, conveyed stones first drop into the end of bucket 108 which is positioned immediately beneath the discharge end of conveyor 86. However, as soon as this end of the bucket fills, the operator may increase the speed of hydraulic motor 84, causing roller 90 to rotate more rapidly and thereby increase the linear speed of solid belt 88. In this manner, the stones are carried further into the bucket, and the bucket can be uniformly cross-loaded. When the bucket has been loaded in the heretofore described manner, the vehicle operator disengages conveyors 39 and 86 and engages hydraulic cylinders 104a and 104b to raise arms 98a and 98b and, thereby, raise bucket 108 to its highest position. As previously indicated, cable 116 automatically tilts conveyor 86 to a vertical position, allowing an auxiliary vehicle, such as a dump truck, to be driven close to the rear of the tractor and underneath bucket 108.

The operator now manipulates controls which activate hydraulic cylinders 114a and 114b whose complementary pistons are attached to operating rods 112a and 112b, causing the bucket to pivot about its pivot points 110a, 110b and thereby deposit its contents into the waiting dump truck. Following the dumping of the stones, the bucket is returned to its original position by reverse operation of the above-mentioned controls, and the conveyor 86 is automatically returned to its original horizontal position as the arms 94a, 94b are lowered. The conveyor belts are again engaged for movement and raking is resumed. As will be obvious during the bucket lifting and dumping operation, the belts of both conveyors will be stopped by disengaging the power takeoff unit, the variable speed transmission 52, and the hydraulic motor 84.

In order to prevent damage to the rake and to the conveyor due to rough or sloping ground, or in order to avoid damage to these members by striking embedded obstacles which may lie in the path of the tractor, the trailing end of rake 22 and the lower end of conveyor 39 is free-floating, but may be lifted by actuation of hydraulic cylinder 38a. Piston 36a is extended, causing rocker arm 34a to pivot about its center attachment point on side rail 18a. Chain 32a is thus tightened, raising the trailing end of rake 22 and, simultaneously, the lower end of conveyor 39 to which it is attached. If desired, both ends of the rake may be raised or lowered simultaneously, or either end raised or lowered independently by appropriate actuation of hydraulic cylinders 38a, 38b, as will be obvious to one skilled in the art.

An embedded boulder or other obstacle may also be removed by my invention through operation of bucket 108 at the ends of arms 98a and 98b, thus avoiding the necessity of employing still another vehicle during the stone gathering operation.

If for any reason it is desired to selectively rake stones having larger or smaller diameters, adjustment of the gap between rake teeth 26 may be conveniently accomplished by either removing teeth, adding teeth or merely loosening them and sliding them in adjustment slots 25 of support bar 24. Ordinarily, I have found that the optimum spacing between the rake teeth is the same as that between crossrods 42 of conveyor 39.

I have found that the operation of the stone gathering machine according to my invention provides versatile, convenient, economical and simple removal of stones from a right-of-way to be cleared at speeds of up to about 4 miles per hour. I have also found that one operator, one foreman and one truck driver employing my invention can clear stones in the described range of sizes from a right-of-way in less than half the time formerly required by six to eight laborers.

It will be understood that modifications, within the scope of the appended claims, may be made in the design and arrangement of parts without departing from the spirit and scope of my invention.

I claim:

1. In combination with a self-powered land vehicle having front and rear wheels, a stone gathering machine which comprises:

a horizontally disposed frame including substantially parallel, spaced-apart side rails rigidly connected together by cross members and removably mounted on said vehicle;

a rake attached to said frame and positioned intermediate the front and rear wheels of said vehicle at an angle to the center line thereof so as to have a forward end on one side of the vehicle and a trailing end on the other side thereof, said rake including a plurality of adjustable, spaced-apart teeth;

a first conveyor mounted at one side of said vehicle and generally parallel with the center line thereof, one end of said first conveyor being in a relatively high position and pivotally attached to said frame adjacent said rear wheels, the other end of said conveyor being in a relatively low position and pivotally attached to the trailing end of said rake;

means for operating said first conveyor;

means for raising and lowering at least one end of said rake and the lower end of said first conveyor;

a second conveyor pivotally attached to said frame and mounted at the rear of said vehicle, substantially transverse said first conveyor and adjacent the relatively high end thereof;

means for operating said second conveyor;

a pair of horizontally spaced-apart arms arranged on either side of and generally parallel to the center line of said vehicle, the inner ends of said pair of arms being pivotally attached to the side rails of said frames;

a tiltable receptacle of bucket pivotally attached to the outer ends of said arms and suspended therebetween; and means for raising and lowering said arms and for tilting said bucket.

2. A stone gathering machine in accordance with claim 1 wherein said first conveyor and means for operating it includes a flexible endless belt comprising a plurality of spaced-apart crossrods linked at their ends and positioned substantially transverse the direction of movement of said belt; a sprocket having teeth engagable with said crossrods for driving said belts; a journaled drive shaft coupled to said sprocket; a variable speed transmission including a reverse gear coupled to said drive shaft; said variable speed transmission being drivingly coupled to a power takeoff unit mounted on said vehicle.

3. A stone gathering machine in accordance with claim 2 wherein said means for raising and lowering at least one end of said rake and the lower end of said first conveyor comprises a pair of hydraulic cylinders attached to said frame and including a pair of complementary pistons reciprocable therein, the free end of one of the pistons of said pair being pivotally attached to the forward end of said rake and the free end of the other piston of said pair being pivotally attached to the trailing end of said rake; and control means for actuating said cylinders to reciprocably move said pistons.

4. A stone gathering machine in accordance with claim 3 wherein said second conveyor and means for operating it comprises a flexible, endless belt in the form of a closed loop; a drive roller positioned inside the loop of said belt and engagable therewith, said drive roller being positioned at one end of said conveyor and journaled for rotation; an idler roller positioned at the other end of said conveyor and journaled for rotation to maintain said belt in a continuous taut loop; a hydraulic motor fastened to said conveyor and rotatably coupled with said drive roller; and control means for actuating said hydraulic motor.

5. A stone gathering machine in accordance with claim 4 wherein said means for raising and lowering said arms include a pair of hydraulic cylinders having complementary pistons reciprocable therein, the ends of said cylinders being pivotally attached to said frame, and the ends of said pistons being pivotally attached to said arms intermediate the inner and outer ends thereof.

6. A stone gathering machine in accordance with claim 1 further comprising means for tilting said second conveyor from a normally substantially horizontal position to a substantially vertical position.

7. A stone gathering machine in accordance with claim 6 wherein said means for tilting said second conveyor includes at least one pivot arm attached to one edge of the conveyor; a cable bracket attached to the opposite edge thereof; at least one bearing rotatably attached to the drive shaft of said first conveyor and fixedly attached to said pivot arm; a cable having one end attached to said cable bracket and the other end passing over a self-aligning pulley attached to said frame and thence over a rotatable block fixedly attached to said frame and thence to an adjustment plate fixedly attached to one of said arms intermediate the ends thereof whereby the raising of said one arm tightens the cable and causes said second conveyor to pivot on said bearing rotatable about said drive shaft and tilt into a vertical position.

8. A stone gathering machine in accordance with claim 1 wherein said means for operating said second conveyor, said means for raising and lowering said rig, and said means for raising and lowering said arms and for tilting said receptacle or bucket comprise a hydraulic system including a reservoir of hydraulic fluid; means in fluid connection with said reservoir for pumping said hydraulic fluid through said system and for selectively developing hydraulic pressure therein; first valve means for stopping and starting the flow of said hydraulic fluid; second valve means for adjusting the rate of flow of said hydraulic fluid in said system; and suitable pressure hoses or hydraulic lines for transmitting said hydraulic fluid under pressure to utilization devices located at various points throughout said system and for returning said hydraulic fluid under pressure from said utilization devices, said utilization devices including said hydraulic cylinders and said hydraulic motor.

9. A stone gathering machine in accordance with claim 3 wherein said rake further comprises:
an elongated support bar; and
a rigid, generally triangular member disposed substantially horizontally beneath said vehicle, one apex of said member being pivotally attached, by means of a universal joint, to said frame at a position located intermediate the rear wheels of said vehicle; a leg of said member adjacent said one apex being attached to said support bar intermediate the center and one end thereof; a leg of said member opposite said one apex being attached to said support bar intermediate the center and the other end thereof; and a Pitman arm pivotally attached at one end thereof to said frame and pivotally attached at the other end thereof to said support bar.

10. A stone gathering machine in accordance with claim 9 wherein said support bar comprises a pair of elongated angle iron members fastened together at intervals along their length by means of transverse gusset plates which maintain said members in a parallel, side-by-side but spaced-apart relationship and define an elongated slot therebetween; and wherein said rake further comprises a plurality of carved teeth made from resilient, tough material, each tooth having a free lower end engagable with a surface being raked and an upper end removably attached to said support bar by fasteners which cooperably and slideably engage with the slot therein to provide for a desired positionment of said tooth along said support bar, and each tooth also including a shoe integral with the upper end thereof for engagement with the support bar to aid in locking the tooth into said desired positionment and maintain its alignment with adjacent teeth.